(12) United States Patent
Aoki

(10) Patent No.: US 6,457,503 B1
(45) Date of Patent: Oct. 1, 2002

(54) PNEUMATIC TIRE

(75) Inventor: Chieko Aoki, Kobe (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 0 days.

(21) Appl. No.: 09/700,914

(22) PCT Filed: Mar. 31, 2000

(86) PCT No.: PCT/JP00/02134
§ 371 (c)(1),
(2), (4) Date: Nov. 21, 2000

(87) PCT Pub. No.: WO00/59741
PCT Pub. Date: Oct. 12, 2000

(30) Foreign Application Priority Data

Apr. 2, 1999 (JP) ............................................. 11-096611
Apr. 2, 1999 (JP) ............................................. 11-096612

(51) Int. Cl.$^7$ ............................. B60L 13/00; B60L 3/00; B60L 17/00
(52) U.S. Cl. ....................... 152/454; 152/516; 152/525
(58) Field of Search ................................ 152/454, 525, 152/516

(56) References Cited

U.S. PATENT DOCUMENTS 5,388,626 A * 2/1995 Asano et al. ................ 152/454
5,427,166 A   6/1995 Willard, Jr.

FOREIGN PATENT DOCUMENTS

| EP | 371755 A2 | 6/1990 |
| EP | 456437 A2 | 11/1991 |
| EP | 0 519 662 A1 | 12/1992 |
| EP | 860304 A2 | 8/1998 |
| JP | 9164822 A | 6/1997 |
| JP | 11334315 A | 12/1999 |

* cited by examiner

Primary Examiner—Adrienne C. Johnstone
(74) Attorney, Agent, or Firm—Birch, Stewart, Kolasch & Birch, LLP

(57) ABSTRACT

A pneumatic tire having a toroidal carcass satisfies the following expressions:
$Ra/D \leq 0.08$;
$Rb/D \leq 0.08$;
$0 < \phi a \leq 50°$; and
$0 < \phi b \leq 50°$.
Alternatively, the pneumatic tire has a tire section constant J per a unit circumferential length of 0.8 or smaller.

6 Claims, 9 Drawing Sheets

PNEUMATIC TIRE

TECHNICAL FIELD

The present invention relates to a pneumatic tire in which run-flat performance can be improved while suppressing increase of tire weight.

BACKGROUND TECHNIQUE

Recent improvement of safety equipment for vehicles is striking. For example, ABS, an air bag system, a crushable body, and the like tend to become standard equipment even on a low-priced car and safety is now the most important challenge in a field of the automobile industry and this is not different in a field of a tire. Not only basic performance such as traveling, making a turn, and stopping but also traveling performance after a tire blowout is desired to be developed. In other words, the desire to a tire is growing, on which tire a driver can drive a car by himself/herself to the nearest gas station or automobile repair shop when the tire blowout has occurred in traveling such that the driver does not have to replace the tire at a road shoulder on an express way, at midnight, in bad weather, or the like.

The inventors studied a process of getting damaged of the tire after blowout and found that the process was generally as follows. If the tire blows and air leaks from the tire, vertical deflection of the tire increases, stress concentrates especially on a portion of a tire inner cavity, and a seriously distorted portion generates heat. Such heat generation causes early generation of separation and wear of rubber and causes a carcass that is a framework of the tire to be exposed. The carcass and a road surface or the carcass and the carcass rub against each other to cause rupture, the tire is fatally damaged, and traveling becomes impossible.

As a countermeasure against this, rigidity of the whole tire is normally increased so as to improve durability. Specifically, the number of plies of the carcass that is the framework of the tire is increased or a thickness of rubber is increased, for example. Because these means have been embodied substantially empirically, weight of the tire has been increased by a large amount.

The present invention has been accomplished with the above circumstances in view and it is an object of the present invention to provide a pneumatic tire in which run-flat performance as continuous traveling performance after blowout can be improved based on considering a model of stress analysis of a tire and improving a sectional shape of the tire to obtain an optimal sectional shape by which maximum stress applied to the tire can be reduced while minimizing increase in tire weight.

DISCLOSURE OF THE INVENTION

According to a first invention of the present invention, there is provided a pneumatic tire comprising a carcass extending from a tread portion through sidewall portions to bead cores in bead portions and satisfying the following expressions (1) to (4):

$Ra/D \leq 0.08$ (1);

$Rb/D \leq 0.08$ (2);

$0 < a \leq 50°$ (3); and $0 < b \leq 50°$ (4), where, in a tire meridional section in a standard state in which the tire is mounted on a standard wheel rim, inflated to a standard inner pressure, and not loaded, Ra is a radius of curvature of a first arc having a center Oa on a tire axial direction line X passing through a midpoint between a first point A and a second point B and on a tire inner cavity side and in contact with a tire center line at the first point A, the first point A being a point where a tire radial direction line Y passing through a wheel rim width position of the standard wheel rim intersects the tire center line passing through a midpoint of a thickness of the tire on a tread portion side and a second point B being a point where the tire radial direction line Y intersects the tire center line on a bead portion side, Rb is a radius of curvature of a second arc having a center Ob on the tire axial direction line X and on the tire inner cavity side and in contact with the tire center line at the second point B, $\phi a$ is an angle formed by the tire axial direction line X and a straight line Oa-A connecting the center Oa and the first point A, $\phi b$ is an angle formed by the tire axial direction line X and a straight line Ob-B connecting the center Ob and the second point B, and D is an outer diameter of the tire in the standard state.

In the pneumatic tire according to the first invention, it is preferable that the tire satisfies the above expressions (1) to (4) and that a tire constant T defined by the following expression (5) is $1.6 \times 10^{-3}$ or smaller:

$$T = \{(Ra/D)/Z\} \times \{1 - \cos(\phi a/2)\} + \{(Rb/D)/Z\} \times \{1 - \cos(\phi b/2)\} \quad (5),$$

where $Z = h^2/6$, and h = a thickness of each sidewall portion on the tire axial direction line X.

At this time, it is preferable that the thickness h of each the sidewall portion on the tire axial direction line X is 0.008 to 0.022 times the outer diameter D of the tire.

In the pneumatic tire according to the first invention, it is preferable that the tire satisfies the above expressions (1) to (4) and that a tire curvature constant V defined by the following expression (6) is $10 \times 10^{-3}$ or smaller:

$$V = (Ra/D) \times \{1 - \cos(\phi a/2)\} + (Rb/D) \times \{1 - \cos(\phi b/2)\} \quad (6).$$

According to the second invention of the present invention, there is provided a pneumatic tire comprising a carcass extending from a tread portion through sidewall portions to bead cores in bead portions, wherein a tire section constant J per a unit circumferential length defined by the following expression (9) is 0.8 or smaller:

$$J = \frac{Ra}{Z}\left(1 - \sqrt{1 - \frac{H^2}{16Ra^2}}\right) + \frac{Rb}{Z}\left(1 - \sqrt{1 - \frac{H^2}{16Rb^2}}\right), \quad (9)$$

where, in a tire meridional section in a standard state in which the tire is mounted on a standard wheel rim, inflated to a standard inner pressure, and not loaded, Ra is a radius of curvature of a first arc having a center Oa on a tire axial direction line X passing through a midpoint between a first point A and a second point B and on a tire inner cavity side and in contact with a tire center line at the first point A, the first point A being a point where a tire radial direction line Y passing through a wheel rim width position of the standard wheel rim intersects the tire center line passing through a midpoint of a thickness of the tire on a tread portion side and a second point B being a point where the tire radial direction line Y intersects the tire center line on a bead portion side, Rb is a radius of curvature of a second arc having a center Ob on the tire axial direction line X and on the tire inner cavity side and in contact with the tire center line at the second point B, H is a distance in a radial direction of the tire from the first point A to the second point B, $Z=h^2/6$, and h is a thickness of each the sidewall portion on the tire axial direction line X.

In the pneumatic tire according to the second invention, it is preferable that the thickness h of each the sidewall portion on the tire axial direction line X is 0.01 to 0.022 times an outer diameter D of the tire in the standard state and that an arc coefficient C of the tire defined by the following expression (10) is 5.0 or smaller:

$$C = Ra \cdot \left(1 - \sqrt{1 - \frac{H^2}{16Ra^2}}\right) + Rb \cdot \left(1 - \sqrt{1 - \frac{H^2}{16Rb^2}}\right) \quad (10)$$

In the pneumatic tire according to the second invention, the distance H in the radial direction of the tire is 0.085 times the outer diameter D of the tire in the standard state or smaller.

PREFERRED EMBODIMENT TO CARRY OUT THE INVENTION

An embodiment of the present invention will be described below based on the drawings.

Figure 1:
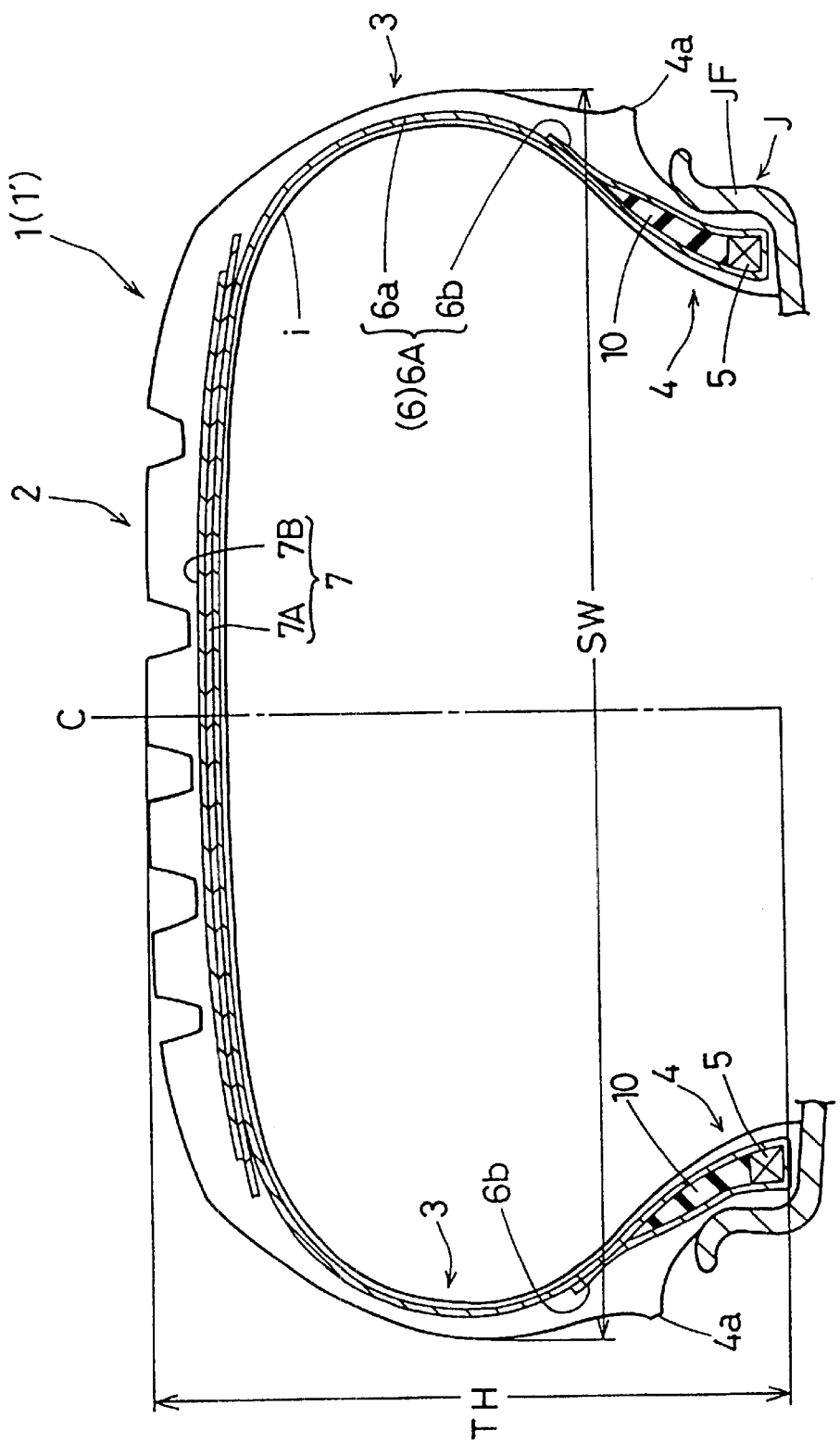
FIG. 1 is a sectional view of a pneumatic tire showing an embodiment of the present invention.

FIG. 1 shows a tire meridional section including a tire axis of a pneumatic tire 1 of the present embodiment and shows a radial tire of a tubeless type (205/55R15) for passenger cars including a carcass 6 extending from a tread portion 2 through sidewall portions 3 to bead cores 5 in bead portions 4 and a belt layer 7 disposed on a radially outside of the tire of the carcass 6 and having an inner liner rubber on a tire inner cavity face i as an example. In FIG. 1, the tire is illustrated as an assembly formed of the tire and a wheel rim in a standard state in which the tire is mounted on a standard wheel rim J, inflated to a standard inner pressure (180 kPa), and not loaded and a tire section width SW is 223.0 mm and a tire section height TH is 112.0 mm.

In the present specification, the "standard wheel rim" is a wheel rim specified for each tire by a standard in a standard system including the standard on which the tire is based and is a normal wheel rim when specified by JATMA, a design rim by TRA, and a measuring rim by ETRTO, for example. The "standard inner pressure" is air pressure specified for each tire by each standard in a standard system including a standard on which the tire is based and is defined as the highest air pressure when specified by JATMA, the maximum value in a table "TIRE LOAD LIMITS AT VARIOUS COLD INFLATION PRESSURES" by TRA, and inflation pressure by ETRTO. However, when the tire is for the passenger cars, the "standard inner pressure" is 180 kPa uniformly.

The carcass 6 is formed of one ore more (one, in this example) carcass plies 6A with a radial structure formed by arranging carcass cords at angles in a range of 75° to 90° with respect to a tire equator C. As the carcass cords, organic fiber cords of nylon, rayon, polyester, and the like can be used. The carcass ply 6A having a main portion 6a extending from the tread portion 2 through the sidewall portions 3 to the bead cores 5 in the bead portions 4 and turned-up portions 6b extending from the main portions 6a and turned up around the bead cores 5 is shown as an example. Between the main portion 6a and the turned-up portions 6b, bead apexes 10 extending outward in a radial direction of the tire from the bead cores 5 and made of hard rubber are disposed to reinforce the bead portions 4. In this example, the tire including wheel rim protectors 4a extending to cover outsides in the radial direction of the tire of rim flanges JF at the bead portions 4 is shown as an example.

The belt layer 7 is formed by placing at least two (inner and outer two, in this example) belt plies 7A and 7B with one on the other, each the belt ply being formed of cords arranged at small angles of 15 to 40°, for example, with respect to the tire equator. The belt piles 7A and 7B are placed such that the cords are in directions crossing each other. Although steel cords are used as the belt cords in this example, organic fiber cords with high elasticity such as aramid and rayon can be also used if necessary. A band layer arranged at an angle of 5° or smaller with respect to the tire equator C may be provided on an outside in the radial direction of the tire of the belt layer 7. Although rubber reinforcing layers having substantially crescent sectional shapes are not provided to inner faces of the sidewall portions 3 in the present embodiment, it is possible to provide the rubber reinforcing layers to properly reinforce the sidewall portions 3 and to properly set hardness and a coefficient of elasticity of rubber disposed at the sidewall portions 3 so as to improve the run-flat performance.

Figure 2:
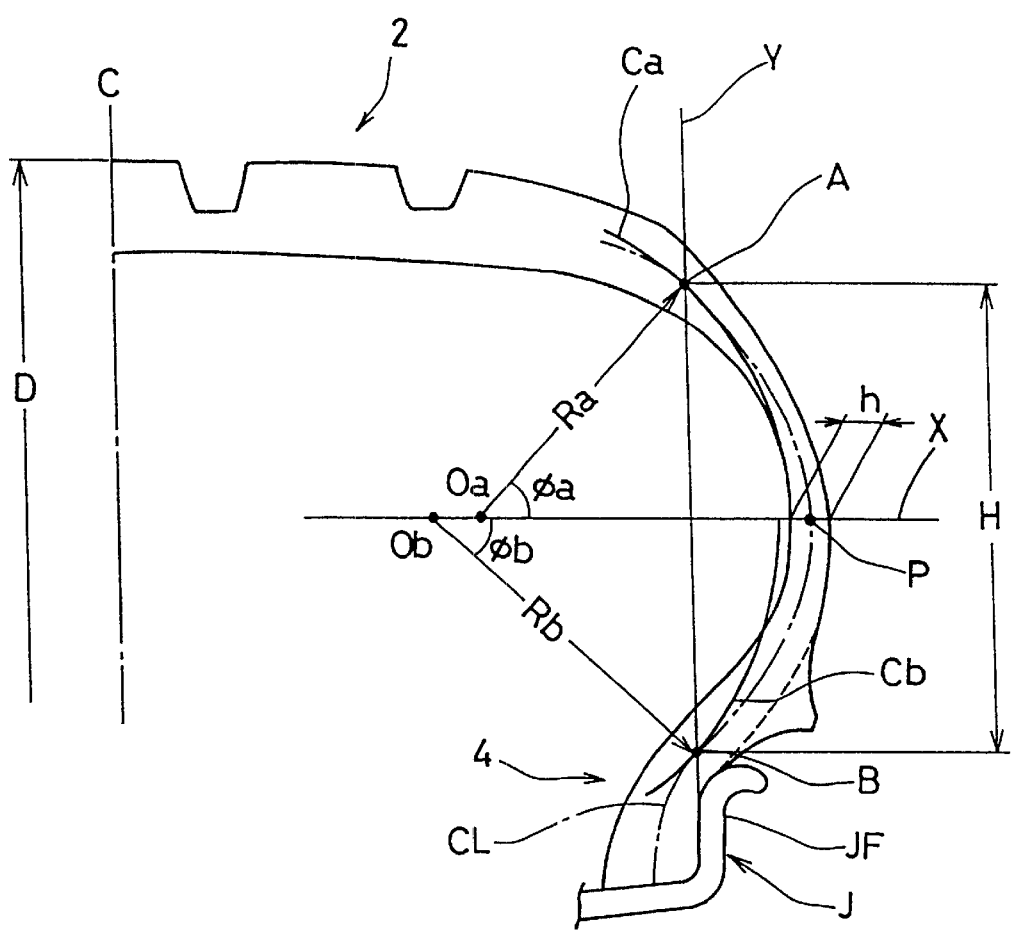
FIG. 2 is a sectional view of a right half of an outline of the pneumatic tire.

FIG. 2 shows an outline of a tire meridional section (right half portion) including a tire axis in a standard state of the pneumatic tire 1. In FIG. 2, a tire center line CL passing through a center of a thickness of the tire is shown by a one-dot dashed line. Here, the "tire center line" is specified based on the outline (shown by a dotted line) of the bead portion 4 that does not include patterns on a tire outer surface and the projection of the wheel rim protector 4a formed at the bead portion 4, i.e., excluding the wheel rim protector 4a in this example.

In FIG. 2, a first point where a tire radial direction line Y passing through a wheel rim width position (an inner face position of the wheel rim flange JF) of the standard wheel rim J intersects the tire center line CL on a tread portion 2 side is defined as A and a second point where the tire radial direction line Y intersects the tire center line CL on a bead portion 4 side is defined as B. A radius of curvature of a first arc Ca having a center Oa on a tire axial direction line X passing through a midpoint between the first point A and the second point B and on a tire inner cavity side and in contact with the tire center line CL at the first point A is defined as Ra and a radius of curvature of a second arc Cb having a center Ob on the tire axial direction line X and on the tire inner cavity side and in contact with the tire center line CL at the second point B is defined as Rb. The centers Oa and Ob of the respective arcs Ca and Cb can be determined respectively as points where normals perpendicular to tangents to the tire center line CL at the first point A and the second point B intersect the tire axial direction line X. An intersection point P of the tire center line CL and the tire axial direction line X on an outside in the tire axial direction of the arcs Ca and Cb on the tire axial direction line X is shown as an example. Furthermore, an angle formed by the tire axial direction line X and a straight line Oa-A connecting the center Oa and the first point A is defined as $\phi a(\deg)$ and an angle formed by the tire axial direction line X and a straight line Ob-B connecting the center Ob and the second point B is defined as $\phi b(\deg)$. If an outer diameter of the tire in a standard state is defined as D, the pneumatic tire 1 of the first invention is characterized in that it satisfies the following expressions (1) to (4). Here, Ra and D are of the same unit.

$$Ra/D \leq 0.08 \quad (1)$$

$$Rb/D \leq 0.08 \quad (2)$$

$$0 < \phi a \leq 50° \quad (3)$$

$$0 < \phi b \leq 50° \quad (4)$$

Figure 6A:
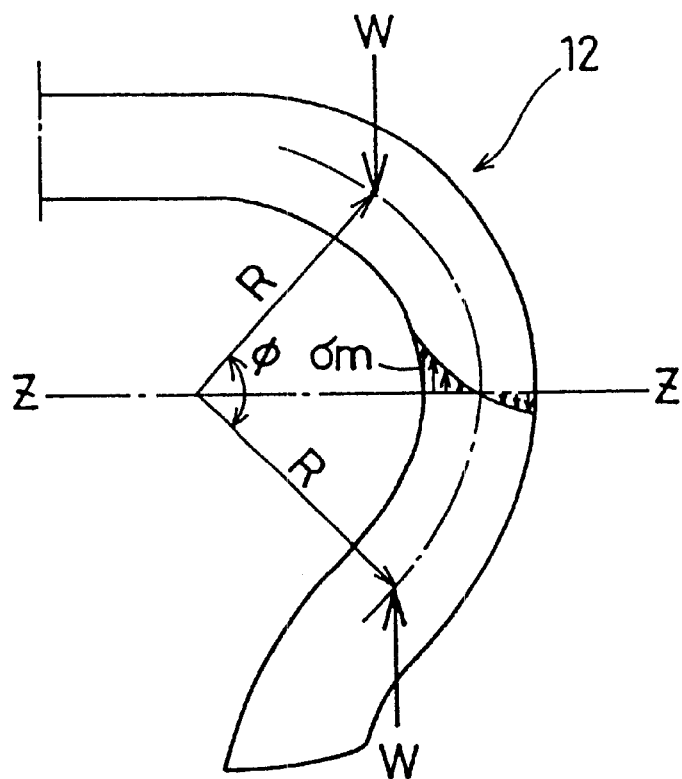
FIG. 6(A) is a conceptual view showing a curved beam as an example.

The inventors tried to apply stress analysis of a curved beam 12 as shown in FIG. 6 to the tire. First, if a compression load W is applied to the curved beam 12 with a radius R of curvature as shown in FIG. 6(A), the maximum stress $\sigma m$ in a section Z—Z is approximately expressed by the expression (7).

$$\sigma m = WR \cdot \{1 - \cos(\phi/2)\}/Z' \quad (7)$$

Figure 6B:
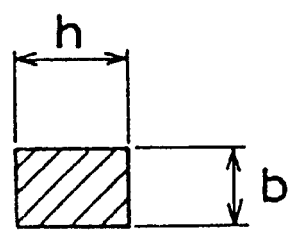
FIG. 6(B) is a sectional view taken along a line Z—Z in FIG. 6(A).

Here, $Z' = bh^2/6$. As shown in FIG. 6(B) that is a sectional view taken along a line Z—Z in FIG. 6(A), h represents a thickness of the beam in the section Z—Z and b represents the width.

From the expression (7), it can be understood that the radius R of curvature of the curved beam and its central angle $\phi$ should be reduced to reduce the maximum stress $\sigma m$ without increasing the thickness h of the beam. If this is applied to the tire, the radius R of curvature and the central angle $\phi$ of the curved beam respectively correspond to a radius of curvature and its central angle of the sidewall portion 3 of the tire. Therefore, by controlling the radius of curvature and the central angle (sectional height) of the sidewall portion 3 of the tire so as to reduce them, the maximum stress can be reduced without increasing a rubber thickness of the tire, for example, durability can be improved, and a continuous traveling distance after blowout can be increased. The radius Ra of curvature of the first arc Ca and the radius Rb of curvature of the second arc Cb may be the same as each other or may be different from each other. Similarly, $\phi a$ and $\phi b$ may be the same as each other or may be different from each other.

The inventors made a considerable number of tires by way of test outline shapes of the sidewall portions 3 of which were varied to obtain varying radiuses Ra, Rb of curvature and varying central angles $\phi a$ and $\phi b$ and studied the continuous traveling distances after blowout of the tires. As a result, limiting the shape of the tire to satisfy the above expressions (1) to (4) regardless of the tire size and the like was found to be particularly preferable so as to improve durability in the run-flat traveling. In the case of the prior-art general pneumatic tire, Ra/D (or Rb/D) is generally set at a value greater than 0.08 and a value of this ratio Ra/D (or Rb/D) is set at a value smaller than that in prior-art in the present invention.

Here, if the ratio (Ra/D) or (Rb/D) exceeds 0.08, the maximum stress applied to the sidewall portion 3 cannot be reduced and durability of the pneumatic tire 1 cannot be expected to be improved satisfactorily. Similarly, if the angles $\phi a$ and $\phi b$ exceed 50°, the maximum stress applied to the sidewall portion 3 cannot be reduced and durability of the pneumatic tire 1 cannot be expected to be improved satisfactorily. On the other hand, if the ratio (Ra/D) or (Rb/D) is too small, ride comfort tends to be degraded. It is desirable to set the ratio (Ra/D) or (Rb/D) at 0 to 0.075, more desirable at 0.01 to 0.07, and still more desirable at 0.03 to 0.065. It is desirable to set the angle $\phi a$ or $\phi b$ at 0 to 45°, more desirable at 10 to 40°, and still more desirable at 20 to 35°.

If the above expression (7) is applied to the tire, it can be expressed by the following expression (8).

$$\sigma m = WRa \cdot \{1 - \cos(\phi a/2)\}/Z + WRb \cdot \{1 - \cos(\phi b/2)\}/Z \quad (8)$$

This expression (8) expresses the maximum stress with respect to a certain load W. What is obtained by dividing the expression (8) by the load W and dividing by the outer diameter D of the tire so as to eliminate influence of the tire size is expressed by a parameter, "a tire constant T" per a unit circumferential length in the present specification and is defined by the following expression (5). Setting the tire constant T at a value $1.6 \times 10^{-3}$ or smaller was found to be preferable.

$$T = \{(Ra/D)/Z\} \times (1 - \cos(\phi a/2)) + \{(Rb/D)/Z\} \times (1 - \cos(\phi b/2)) \quad (5)$$

Here, $Z = h^2/6$, h is a thickness of the sidewall portion on the tire axial direction line X and unit of Ra, Rb, D, and h is (mm).

Figure 3:
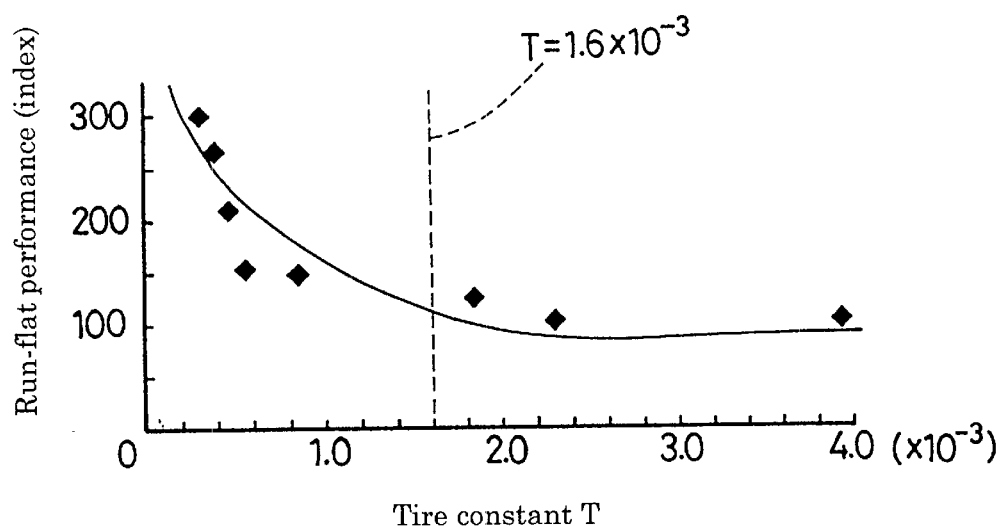
FIG. 3 is a graph showing a relationship between a tire constant T and run-flat performance.

FIG. 3 shows a graph of a result obtained by making the tires with varying tire constant T by way of test and testing the run-flat performance of each the tire. The run-flat performance can be obtained by mounting each of tires in two sizes, 215/45ZR17 and 205/55R15 on a wheel rim with an inner pressure of 0 kPa, mounting it to a front right side of a domestically produced passenger car, causing the car to travel a test course, testing a continuous traveling distance traveled by the tire that has blown until the tire can no longer be used for traveling, and making it an index. The test course includes a straight portion and a corner portion and the test was conducted on the same condition that a traveling speed in the straight portion is 50 km/H and that a traveling speed in the corner portion is 40 km/H. The test was conducted while the thickness h of the sidewall portion on the tire axial direction line X of every tire was set at 13 mm. As is clear from FIG. 3, the run-flat performance tends to reduce as the tire constant T increases. However, the run-flat performance was found to be kept at a satisfactorily high level by setting the tire constant T at $1.6 \times 10^{-3}$ or smaller and it is more desirable to set the tire constant T at $1.0 \times 10^{-3}$ or smaller and still more desirable at $0.6 \times 10^{-3}$ or smaller. A lower limit of the tire constant T is preferably set at $0.4 \times 10^{-3}$, for example.

Figure 4:
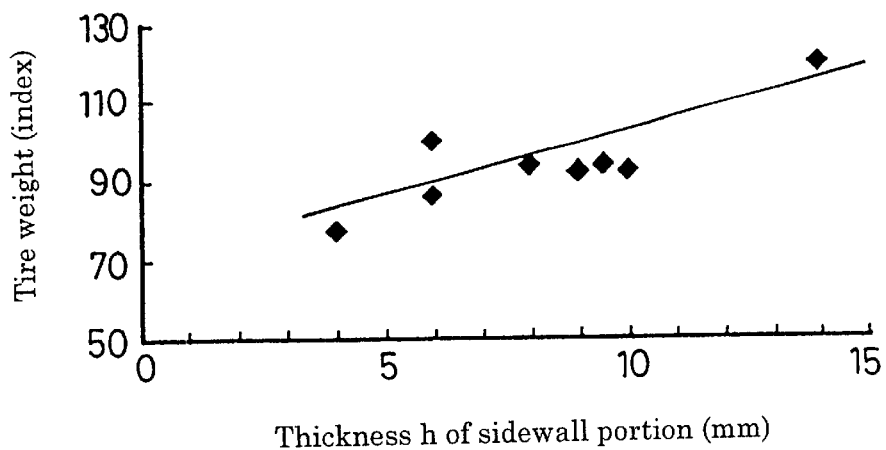
FIG. 4 is a graph showing a relationship between tire weight and a thickness of a sidewall portion.

FIG. 4 shows a relationship between the thickness h of the sidewall portion 3 on the tire axial direction line X and tire weight (index) of one tire. If the thickness h of the sidewall portion is too small, absolute rigidity of the sidewall portion 3 tends to reduce. Therefore, it is desirable to set the thickness h at 5 mm or greater and more desirable at 8 mm or greater. If the thickness h of the sidewall portion 3 is too large, the tire weight tends to increase considerably. Therefore, the thickness h is preferably set at 13 mm or smaller, for example. The concrete thickness is preferably set such that a ratio (h/D) between the thickness h and the tire outer diameter D is about 0.008 to 0.022.

In the present embodiment, the above expression (8) is multiplied by Z to eliminate an element of the thickness h of the sidewall portion, expressed by a parameter, a curvature constant V of the tire so as to test an influence of a sectional shape of the sidewall portion 3, and defined by the following expression (6). Setting the curvature constant V of the tire at $10 \times 10^{-3}$ or smaller was found to be preferable.

$$V = (Ra/D) \times \{1 - \cos(\phi a/2)\} + (Rb/D) \times \{1 - \cos(\phi b/2)\} \quad (6)$$

Figure 5:
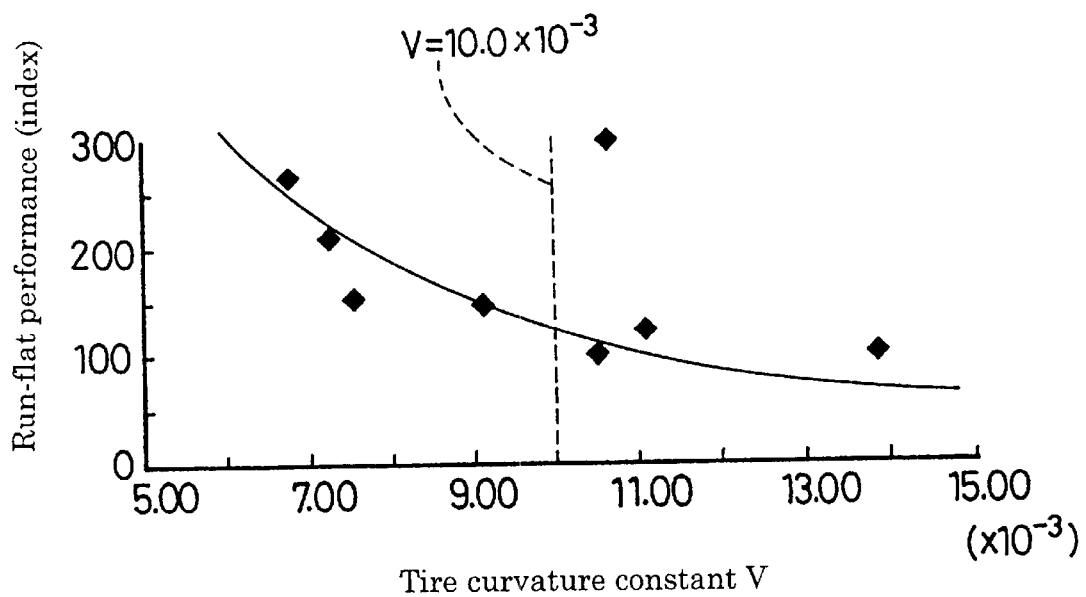
FIG. 5 is a graph showing a relationship between a tire curvature constant V and the run-flat performance.

FIG. 5 shows a result of testing of the run-flat performance when the curvature constant V of the tire is varied. The run-flat performance was tested by the test similar to the above test. As is clear from FIG. 5, the run-flat performance tends to reduce as the curvature constant V of the tire increases. However, the run-flat performance can be kept at a satisfactorily high level by setting the curvature constant V of the tire at $10.0 \times 10^{-3}$ or smaller and it is more desirable to set the constant V at $9.0 \times 10^{-3}$ or smaller and still more desirable at $8.0 \times 10^{-3}$ or smaller. A lower limit of the curvature constant V is preferably set at $6.0 \times 10^{-3}$, for example. Table 1 shows an example of the respective values Ra, Rb, $\phi a$, $\phi b$, h, T, and V.

In Table 1, tires A, B, tires C, D, tires E, F with the varying thickness h of the sidewall portion 3 are compared with each other, the tire constant T is reduced by increasing h, and it can be seen from FIG. 3 that the run-flat performance is improved. If the tires A and C, for example, with the same thickness h of the sidewall portion 3 are compared with each other, the smaller Ra and Rb are, the more the tire constant T can be reduced. Furthermore, if the tires A and E, for example, with the same thickness h of the sidewall portion 3 are compared with each other, the smaller $\phi a$ and $\phi b$ are, the more the tire constant T can be reduced.

Next, an example of an embodiment of the second invention will be described.

Because the inner structure of the tire similar to that of the embodiment of the first invention is used in the present embodiment, detailed description of the structure will be omitted. In a pneumatic tire 1' of the second invention, similarly to the above, as shown in FIG. 2, a first point where a tire radial direction line Y passing through a wheel rim width position (an inner face position of the wheel rim flange JF) of the standard wheel rim J intersects a tire center line CL on a tread portion 2 side is defined as A and a second point where the tire radial direction line Y intersects the tire center line CL on a bead portion 4 side is defined as B. A radius of curvature of a first arc Ca having a center Oa on a tire axial direction line X passing through a midpoint between the first point A and the second point B and on a tire inner cavity side and in contact with the tire center line CL at the first point A is defined as Ra and a radius of curvature of a second arc Cb having a center Ob on the tire axial direction line X and on the tire inner cavity side and in contact with the tire center line CL at the second point B is defined as Rb. A distance in the tire radial direction from the first point A to the second point B is defined as H. At this time, in the pneumatic tire 1' of the second invention, a tire section constant J per a unit circumferential length defined by the following expression (9) is set at 0.8 or smaller.

$$J = \frac{Ra}{Z}\left(1 - \sqrt{1 - \frac{H^2}{16Ra^2}}\right) + \frac{Rb}{Z}\left(1 - \sqrt{1 - \frac{H^2}{16Rb^2}}\right) \quad (9)$$

Here, $Z = h^2/6$ and h is a thickness of the sidewall portion on the tire axial direction line X. Unit of Ra, Rb, H, and h is (mm).

Here, a stress analysis model of the curved beam 12 as shown in FIG. 6 is considered. First, if a compression load W is applied to the curved beam 12 with a radius R of curvature as shown in FIG. 6(A), the maximum stress $\sigma m$ in a section Z—Z is expressed by the above expression (7).

$$\sigma m = WR \cdot \{1 - \cos(\phi/2)\}/Z' \quad (7)$$

If a distance between points of application of the loads W, W is defined as H', the distance H' can be expressed by the following expression (11).

$$H' = 2R \cdot \sin(\phi/2) \quad (11)$$

If the expression (7) is arranged by using the expression (11) to obtain an expression of H', R, the maximum stress $\sigma m$ in the section Z—Z can be expressed by an expression (12).

TABLE 1

Tire size 215/45R17

|  | Tire A | Tire B | Tire C | Tire D | Tire E | Tire F |
|---|---|---|---|---|---|---|
| Ra (mm) | 48 | 48 | 45 | 45 | 48 | 48 |
| Rb (mm) | 48 | 48 | 45 | 45 | 48 | 48 |
| Ra/D | 0.08 | 0.08 | 0.075 | 0.075 | 0.08 | 0.08 |
| Rb/D | 0.08 | 0.08 | 0.075 | 0.075 | 0.08 | 0.08 |
| $\phi a$ (deg) | 50 | 50 | 50 | 50 | 45 | 45 |
| $\phi b$ (deg) | 50 | 50 | 50 | 50 | 45 | 45 |
| Distance between A and B (mm) | 73.54 | 73.54 | 68.944 | 68.944 | 67.882 | 67.882 |
| D (mm) | 600 | 600 | 600 | 600 | 600 | 600 |
| h/D ($\times 10^{-3}$) | 21.67 | 12.50 | 21.67 | 12.17 | 21.67 | 11.33 |
| Tire constant T ($\times 10^{-3}$) | 0.5322 | 1.5990 | 0.4990 | 1.5823 | 0.4324 | 1.5804 |
| Curvature constant V of tire ($\times 10^{-3}$) | 14.991 | 14.991 | 14.054 | 14.054 | 12.179 | 12.179 |

$$\sigma m = \frac{WR}{Z}\left(1 - \sqrt{1 - \frac{H'^2}{4R^2}}\right) \quad (12)$$

If the expression (12) is applied to the tire as shown in FIG. 2, the maximum stress σm can be obtained as the sum of respective maximum stresses σmb and σma on inner and outer sides of the tire axial direction line X. The radius R of curvature of the curved beam can be approximately applied to the radiuses Ra and Rb of the tire. H' of the curved beam can be applied as a half of the distance H in the radial direction of the tire between the first point A and the second point B of the sidewall portion 3 of the tire. Therefore, the expression (12) can be applied to the pneumatic tire in a phantom manner as the following expression (13). Here, Z represents a sectional coefficient "$h^2/6$" of the sidewall portion per a unit circumferential length and h represents a thickness of the sidewall portion on the tire axial direction line X.

$$\sigma m = \frac{WRa}{Z}\left(1 - \sqrt{1 - \frac{H^2}{16Ra^2}}\right) + \frac{WRb}{Z}\left(1 - \sqrt{1 - \frac{H^2}{16Rb^2}}\right) \quad (13)$$

This expression (13) approximately expresses the maximum stress σm applied to the Z—Z section of the sidewall portion 3 of the pneumatic tire with respect to a certain load W. What is obtained by dividing this expression by the load W is expressed by a parameter, a tire section constant J per a unit circumferential length in the present specification and is defined by the above expression (9). The inventors made a considerable number of tires by way of test outline shapes of the sidewall portions 3 of which were varied to obtain varying radiuses Ra, Rb of curvature and varying distance H in the radius direction of the tire and studied the continuous traveling distances after blowout of the tires. As a result, limiting the tire section constant J defined by the above expression (9) to be 0.8 or smaller regardless of the tire size and the like was found to be particularly preferable so as to improve durability in the run-flat traveling.

Figure 7:
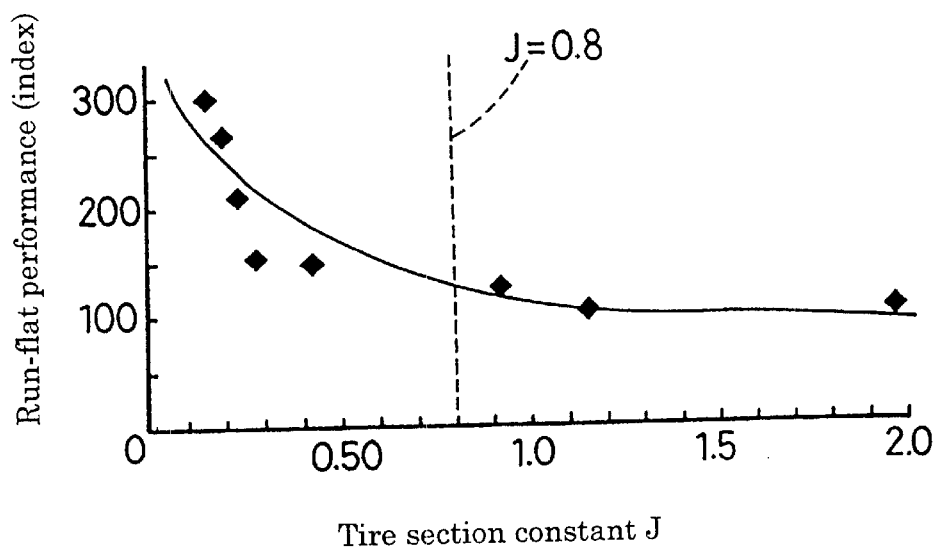
FIG. 7 is a graph showing a relationship between a tire section constant J and the run-flat performance.

FIG. 7 shows a graph of a result obtained by making the tires with varying tire section constant J by way of test and testing the run-flat performance of each the tire. The run-flat performance was measured on the same condition as that in the first invention. As is clear from FIG. 7, the run-flat performance tends to reduce as the tire section constant J increases. However, the run-flat performance was found to be kept at a satisfactorily high level by setting the tire section constant J at 0.8 or smaller and it is more desirable to set the tire section constant J at 0.7 or smaller, still more desirable at a value 0.5 or smaller, and yet more desirable at 0.1 to 0.5. In the case of the prior-art general pneumatic tire for the passenger cars, the tire section constant J is generally set at a value greater than 0.8 and particularly at 1.0 or greater in many cases. As described above, according to the present invention, based on setting the radiuses Ra and Rb of curvature and the distance H such that the tire section constant J can be reduced as compared with prior art, it is possible to reduce the maximum stress applied to the sidewall portion 3 as compared with prior art without increasing the thickness of the sidewall portion 3, for example. As a result, durability of the tire can be improved and the continuous traveling distance after blowout can be increased.

Here, if the tire section constant J exceeds 0.8, this value is at the same level as that of the prior-art tire, the maximum stress applied to the sidewall portion 3 can not be reduced, and durability of the pneumatic tire cannot be expected to be improved satisfactorily.

In the present embodiment, influence of a sectional shape of the sidewall portion 3 was tested by using a parameter, an arc coefficient C (defined by the above expression (10)) of the tire obtained by multiplying the above expression (9) by "Z" to eliminate an element of the thickness h of the sidewall portion 3 of the tire. Setting the arc coefficient C of the tire at 5.0 or smaller was found to be preferable (unit of Ra, Rb, and H is mm).

$$C = Ra \cdot \left(1 - \sqrt{1 - \frac{H^2}{16Ra^2}}\right) + Rb \cdot \left(1 - \sqrt{1 - \frac{H^2}{16Rb^2}}\right) \quad (10)$$

Figure 8:
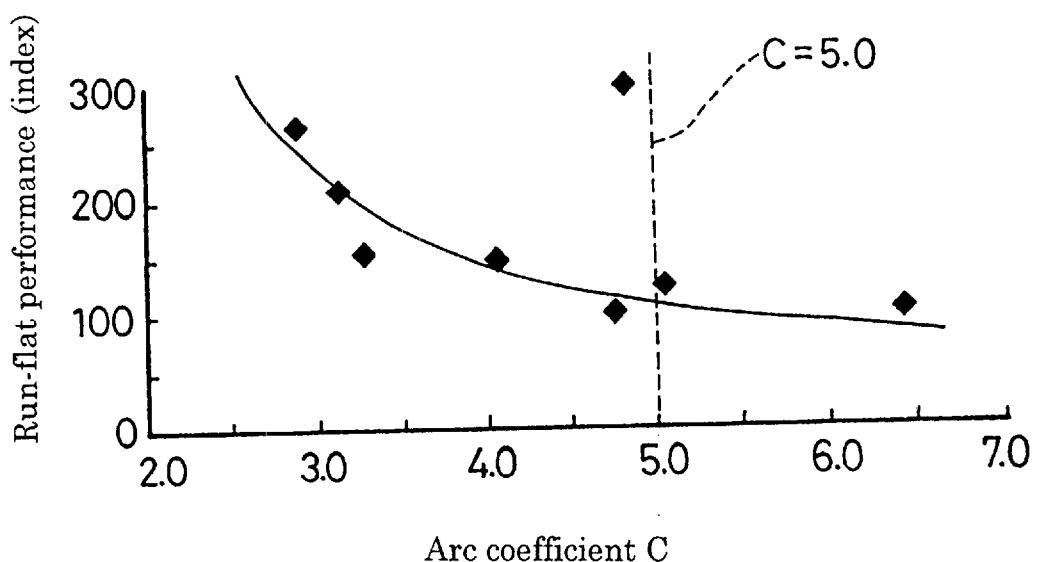
FIG. 8 is a graph showing a relationship between a tire arc coefficient C and the run-flat performance.

FIG. 8 shows a result of testing of the run-flat performance when the arc coefficient C of the tire is varied. The run-flat performance was tested by the test similar to the above test. As is clear from FIG. 8, the run-flat performance tends to reduce as the arc coefficient C of the tire increases. However, the run-flat performance can be kept at an allowable high level by setting the arc coefficient C at 5.0 or smaller and it is more desirable to set the arc coefficient C at 4.0 or smaller and more desirable at 2.5 to 4.0.

Figure 9:
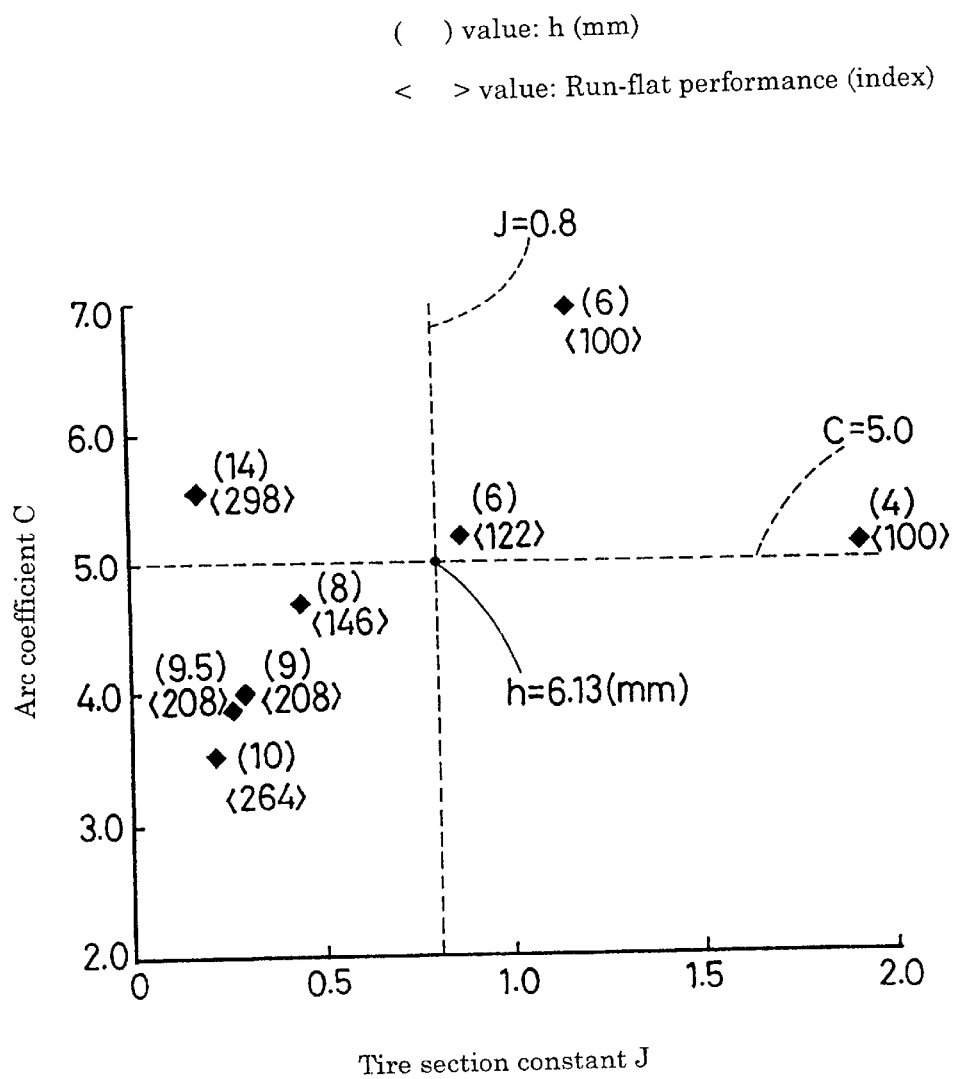
FIG. 9 is a graph showing a relationship between the tire section constant J and the tire arc coefficient C.

FIG. 9 shows a graph with the arc coefficient C plotted in a vertical axis and the tire section constant J in a horizontal axis. On this graph, the run-flat performance (index) and the thickness h of the sidewall portion on the tire axial direction line X of each the tire to be tested are plotted. In FIG. 9, it can be seen that the tire that satisfies both J≦0.8 and C≦5.0 has remarkably satisfactory run-flat performance.

Because a relationship, σm=W·J=C·W/Z holds from the expressions (13), (9), and (10), the following expression (14) holds between the tire section constant J, the arc coefficient C, and Z.

$$J = C/Z \quad (14)$$

This expression (14) indicates that there is linearity between the tire section constant J and the arc coefficient C if the thickness h of the sidewall portion is constant. If J=0.8 and Z=h=$h^2/6$ are substituted into the above expression (14), the thickness h=6.13 (mm) of the sidewall portion can be obtained. Therefore, the thickness h of the sidewall portion is preferably 6.13 mm or greater for the above tire size.

FIG. 4 shows a relationship between the thickness h of the sidewall portion 3 on the tire axial direction line X and the tire weight (index) of one tire. In the second invention, it is also preferable that the thickness h of the sidewall portion 3 is set at 13 mm or smaller, for example, so as to prevent significant increase of the tire weight and particularly to obtain the weight increase of 110% or less. Therefore, in the present embodiment, it is also preferable to set the thickness h of the sidewall portion 3 at 6.13 to 13 mm. Such a specific thickness is set such that a ratio (h/D) between the thickness h and the tire outer diameter D is about 0.01 to 0.022.

Figure 10:
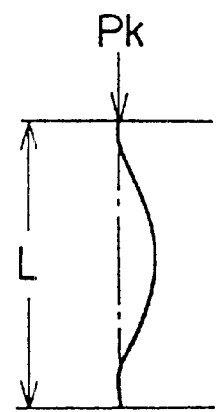
FIG. 10 is a diagram showing a buckling model of a long column.

FIG. 10 shows a model of a long column that receives a load in an axial direction. A buckling load Pk of the long column can be expressed by the following expression (15) from Euler's formula.

$$Pk = n\pi^2 \cdot E \cdot A/(L/k)^2 \quad (15)$$

Here, n: an end condition of the column

E: Young's modulus of material

A: a cross-sectional area of the column

L: a length of the column k: a radius of gyration of area

From this expression (15), it is apparent that the smaller the length L of the column is, the less likely the column is to buckle so as to reduce the buckling load Pk. By applying this to the sidewall portion of the tire and reducing the distance H in the radial direction of the tire between the first point A and the second point B, the maximum stress applied to the sidewall portion 3 can be reduced without increasing the thickness h of the sidewall portion, for example.

Figure 11:
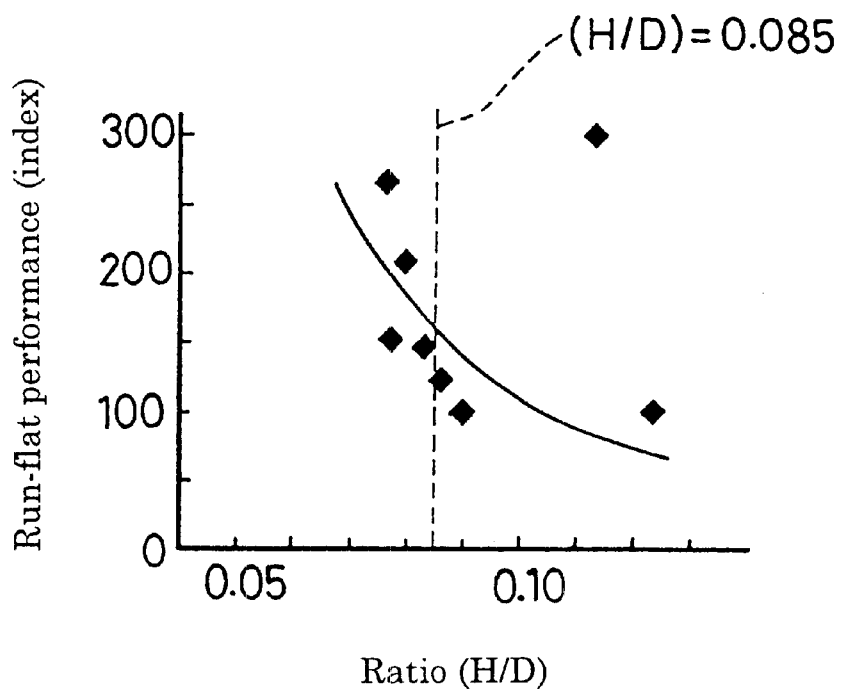
FIG. 11 is a graph showing a relationship between a ratio (H/D) and the run-flat performance.

FIG. 11 shows a result obtained by testing the run-flat performance while varying the distance H. A ratio (H/D) obtained by dividing the distance H by the outer diameter D of the tire in the standard state so as to eliminate the influence of the tire size is plotted in a horizontal axis. The run-flat performance was tested by the test similar to the above test. The thickness h of the sidewall portion of every tire was set at 13 mm. From FIG. 11, it can be seen that the run-flat performance tends to reduce as the distance H of the tire increases. However, the run-flat performance is found to be kept at a high level by setting the ratio (H/D) at 0.85 or smaller and it is more desirable to set the ratio (H/D) at 0.8 or smaller.

As described above, according to the pneumatic tire of the present invention, based on controlling the outline shape of the sidewall portion in the standard state in a certain range, it is possible to reduce the maximum stress applied to the sidewall portion as compared with prior art and it is possible to improve the run-flat performance while suppressing increase of the tire weight, for example.

EXAMPLE 1 (The First Invention)

Pneumatic tires of a tire size of 215/45R16 and shown in Table 2 were made by way of test (Embodiments 1 to 4) and the run-flat performance, tire weight, rolling resistance, and the like were measured. For a purpose of comparison, tires not of the present invention were also made by way of test and tested. Tires of comparison examples 1 and 2 are of the same size as above and tires of a comparison example 3 and prior-art are of a tire size of 205/55R15.

In the test, in addition to the above run-flat performance (the larger a value of an index in which the performance of the prior art is assumed to be 100 is, the more desirable the performance is), the tire weight and rolling resistance were measured. In respect of the tire weight, weight of one tire was measured and was expressed by an index in which weight of the prior art was assumed to be 100. The smaller the value is, the more desirable the weight is. In respect of the rolling resistance, the tire to be tested was mounted on the standard wheel rim and inflated to an inner pressure of 180 kPa and the rolling resistance value was measured by using a drum-type tire rolling resistance tester with a drum diameter of 1707.6 mm while causing the tire to travel under a load of 275 kg per a tire at a speed of 80 km/H. A result of evaluation is expressed by an index in which the rolling resistance of the prior art is assumed to be 100. The smaller the value is, the smaller the rolling resistance is.

A result of the test and the like are shown in Table 2.

TABLE 2

|  | Embodiment 1 | Embodiment 2 | Embodiment 3 | Embodiment 4 | Comparison example 1 | Comparison example 2 | Comparison example 3 | Prior art |
|---|---|---|---|---|---|---|---|---|
| Ra/D | 0.063 | 0.057 | 0.071 | 0.060 | 0.053 | 0.058 | 0.080 | 0.082 |
| Rb/D | 0.063 | 0.058 | 0.058 | 0.057 | 0.060 | 0.065 | 0.105 | 0.091 |
| $\phi a$ (deg) | 38 | 46 | 33 | 40 | 54.5 | 50.5 | 46 | 48.5 |
| $\phi b$ (deg) | 40 | 46 | 42 | 43 | 48 | 45 | 33 | 44 |
| D (mm) (JATMA design dimension) | 600 | 600 | 600 | 600 | 600 | 600 | 607 | 607 |
| h (mm) | 9.5 | 8 | 10 | 9 | 6 | 4 | 14 | 6 |
| Tire constant T ($\times 10^{-3}$) | 0.48 | 0.86 | 0.41 | 0.56 | 1.85 | 3.95 | 0.33 | 2.31 |
| Curvature constant V of the tire ($\times 10^{-3}$) | 7.27 | 9.14 | 6.79 | 7.56 | 11.11 | 10.52 | 10.67 | 13.87 |
| Run-flat performance (index) | 208 | 146 | 264 | 153 | 122 | 100 | 298 | 100 |
| Tire weight (index) | 94 | 94 | 92 | 92 | 85 | 77 | 120 | 100 |
| Rolling resistance (index) | 97 | 97 | 96 | 99 | 95 | 87 | 108 | 100 |
| h/D ($\times 10^{-3}$) | 15.83 | 13.33 | 16.67 | 15.00 | 10.00 | 6.667 | 23.06 | 9.885 |

EXAMPLE 2 (The Second Invention)

Pneumatic tires of a tire size of 215/45R16 and shown in Table 3 were made by way of test (Embodiments 5 to 8) and the run-flat performance, tire weight, rolling resistance, and the like were measured. For a purpose of comparison, tires not of the present invention were also made by way of test and tested. Tires of comparison examples 4 and 5 are of the same size as above and tires of a comparison example 6 and prior-art are of a tire size of 205/55R15. The same test as the example 1 was conducted. A result of the test and the like are shown in Table 3. From the result of the test, it can be seen that the run-flat performance of the tire of each the embodiment is improved without substantially increasing the tire weight.

TABLE 3

|  | Embodiment 5 | Embodiment 6 | Embodiment 7 | Embodiment 8 | Comparison example 4 | Comparison example 5 | Comparison example 6 | Prior art 2 |
|---|---|---|---|---|---|---|---|---|
| Ra (mm) | 38.0 | 34.0 | 42.5 | 36.0 | 32.0 | 35.0 | 48.6 | 50.0 |
| Rb (mm) | 38.0 | 35.0 | 35.0 | 34.0 | 36.0 | 39.0 | 63.5 | 55.0 |
| H (mm) | 48 | 50 | 46 | 46.5 | 52 | 54 | 69 | 75 |
| h (mm) | 9.5 | 8 | 10 | 9 | 6 | 4 | 14 | 6 |
| D (mm) | 600 | 600 | 600 | 600 | 600 | 600 | 607 | 607 |
| H/D | 0.080 | 0.083 | 0.077 | 0.078 | 0.087 | 0.090 | 0.114 | 0.124 |
| h/D | 0.0158 | 0.0133 | 0.0167 | 0.0150 | 0.0100 | 0.0067 | 0.0231 | 0.0099 |
| Tire section constant J | 0.26 | 0.44 | 0.21 | 0.29 | 0.86 | 1.92 | 0.17 | 1.16 |
| Tire arc coefficient C | 3.89 | 4.69 | 3.53 | 3.98 | 5.19 | 5.12 | 5.55 | 6.94 |
| Run-flat performance (index) | 208 | 146 | 264 | 153 | 122 | 100 | 298 | 100 |
| Tire weight (index) | 94 | 94 | 92 | 92 | 85 | 77 | 120 | 100 |
| Rolling resistance (index) | 97 | 97 | 96 | 99 | 95 | 87 | 108 | 100 |

What is claimed is:

1. A pneumatic tire comprising a carcass extending from a tread portion through sidewall portions to bead cores in bead portions and satisfying the following expressions:

$$Ra/D \leq 0.08;$$

$$Rb/D \leq 0.08;$$

$$0 < \phi a \leq 50°; \text{ and}$$

$$0 < \phi b \leq 50°,$$

where, in a tire meridional section in a standard state in which said tire is mounted on a standard wheel rim, inflated to a standard inner pressure, and not loaded, Ra is a radius of curvature of a first arc having a center Oa on a tire axial direction line X passing through a midpoint between a first point A and a second point B and on a tire inner cavity side and in contact with a tire center line at said first point A, said first point A being a point where a tire radial direction line Y passing through a wheel rim width position of said standard wheel rim intersects said tire center line passing through a midpoint of a thickness of said tire on a tread portion side and a second point B being a point where said tire radial direction line Y intersects said tire center line on a bead portion side, Rb is a radius of curvature of a second arc having a center Ob on said tire axial direction line X and on said tire inner cavity side and in contact with said tire center line at said second point B, $\phi a$ is an angle formed by said tire axial direction line X and a straight line Oa-A connecting said center Oa and said first point A, $\phi b$ is an angle formed by said tire axial direction line X and a straight line Ob–B connecting said center Ob and said second point B, and D is an outer diameter of said tire in said standard state.

2. The pneumatic tire according to claim 1, wherein a tire curvature constant V defined by the following expression is $10 \times 10^{-3}$ or smaller:

$$V = (Ra/D) \times \{1 - \cos(\phi a/2)\} + (Rb/D) \times \{1 - \cos(\phi b/2)\}.$$

3. The pneumatic tire according to claim 1, wherein a tire constant T defined by the following expression is $1.6 \times 10^{-3}$ or smaller:

$$T = \{(Ra/D)/Z\} \times \{1 - \cos(\phi a/2)\} + \{(Rb/D)/Z\} \times \{1 - \cos(\phi b/2)\},$$

where $Z = h^2/6$, and h is a thickness of each said sidewall portion on said tire axial direction line X.

4. The pneumatic tire according to claim 3, wherein a tire curvature constant V defined by the following expression is $10 \times 10^{-3}$ or smaller $$V = (Ra/D) \times \{1 - \cos(\phi a/2)\} + (Rb/D) \times \{1 - \cos(\phi b/2)\}.$$

5. The pneumatic tire according to claim 3, wherein said thickness h of each said sidewall portion on said tire axial direction line X is 0.008 to 0.022 times said outer diameter D of said tire.

6. The pneumatic tire according to claim 5, wherein a tire curvature constant V defined by the following expression is $10 \times 10^{-3}$ or smaller:

$$V = (Ra/D) \times \{1 - \cos(\phi a/2)\} +$$

$$(Rb/D) \times \{1 - \cos(\phi b/2)\}.$$

* * * * *